US012677235B2

(12) United States Patent
Chandramouli et al.

(10) Patent No.: US 12,677,235 B2
(45) Date of Patent: Jul. 7, 2026

(54) SIMULTANEOUS REGISTRATION TO MULTIPLE NETWORKS

(71) Applicant: Nokia Technologies Oy, Espoo (FI)

(72) Inventors: Devaki Chandramouli, Dallas, TX (US); Navin Hathiramani, Dallas, NJ (US); Sung Hwan Won, Dallas, TX (US)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 18/553,634

(22) PCT Filed: Mar. 29, 2022

(86) PCT No.: PCT/IB2022/052899
§ 371 (c)(1),
(2) Date: Oct. 2, 2023

(87) PCT Pub. No.: WO2022/208355
PCT Pub. Date: Oct. 6, 2022

(65) Prior Publication Data
US 2024/0188021 A1     Jun. 6, 2024

(51) Int. Cl.
*H04W 60/00*          (2009.01)
*H04W 88/06*          (2009.01)
(52) U.S. Cl.
CPC ................................. *H04W 60/005* (2013.01)
(58) Field of Classification Search
CPC ... H04W 60/005; H04W 68/12; H04W 48/00; H04W 88/06
See application file for complete search history.

(56) References Cited

U.S. PATENT DOCUMENTS

| | | | |
|---|---|---|---|
| 11,690,038 B2 * | 6/2023 | Son | H04W 48/18 |
| | | | 455/435.1 |
| 12,185,234 B2 * | 12/2024 | Lanev | H04W 48/18 |
| 2019/0124561 A1 | 4/2019 | Faccin et al. | |

(Continued)

FOREIGN PATENT DOCUMENTS

| | | |
|---|---|---|
| EP | 3576471 A1 | 12/2019 |
| IN | 40/2023 A | 10/2023 |

(Continued)

OTHER PUBLICATIONS

"3rd Generation Partnership Project; Technical Specification Group Services and System Aspects; ystem architecture for the 5G System (5GS); Stage 2 (Release 16)", 3GPP TS 23.501, V16.6.0, Sep. 2020, pp. 1-447.

(Continued)

*Primary Examiner* — Kathy W Wang-Hurst
*Assistant Examiner* — Garth D Richmond
(74) *Attorney, Agent, or Firm* — Nokia Technologies Oy

(57)          ABSTRACT

Systems, methods, apparatuses, and computer program products for simultaneous registration to multiple networks are provided. A user equipment (UE) may perform dual registration to multiple networks, e.g., a 5G system (5GS) of equivalent public land mobile networks (PLMNs), equivalent stand-alone non-public networks (SNPNs), or a combination of PLMNs and SNPNs. When a UE is registered to the first network, the UE may select the second network for a second registration based on one or more criteria.

15 Claims, 9 Drawing Sheets

(56) References Cited

U.S. PATENT DOCUMENTS

| | | | |
|---|---|---|---|
| 2020/0053545 A1 | 2/2020 | Wong et al. | |
| 2020/0100309 A1* | 3/2020 | Jha ................... | H04W 36/00226 |
| 2020/0205110 A1 | 6/2020 | Bakker | |
| 2020/0329455 A1 | 10/2020 | Ryu et al. | |
| 2023/0276351 A1* | 8/2023 | Tamura ................. | H04W 48/18 |
| | | | 455/435.2 |
| 2023/0308547 A1 | 9/2023 | Hietalahti et al. | |
| 2024/0430839 A1* | 12/2024 | Kuge .................... | H04W 48/18 |

FOREIGN PATENT DOCUMENTS

| | | | |
|---|---|---|---|
| WO | 2020/038300 A1 | 2/2020 | |
| WO | 2020/185949 A2 | 9/2020 | |
| WO | 2020/186092 A2 | 9/2020 | |

OTHER PUBLICATIONS

"3rd Generation Partnership Project; Technical Specification Group Services and System Aspects; Procedures for the 5G System (5GS); Stage 2 (Release 16)", 3GPP TS 23.502, V16.6.0, Sep. 2020, pp. 1-597.

"3rd Generation Partnership Project; Technical Specification Group Core Network and Terminals; Non-Access-Stratum (NAS) protocol for 5G System (5GS); Stage 3; (Release 17)", 3GPP TS 24.501 V17.0.0, Sep. 2020, pp. 1-729.

"3rd Generation Partnership Project; Technical Specification Group Services and System Aspects; Study on security for 5GS enhanced support of Vertical and LAN Services; (Release 16)", 3GPP TR 33.819, V0.3.0, Mar. 2019, pp. 1-25.

Invitation To Pay Additional Fees received for corresponding Patent Cooperation Treaty Application No. PCT/IB2022/052899, dated Jul. 4, 2022, 16 pages.

"23.502: Update of registration procedure to include dual-registration mode indication", SA WG2 Meeting # 121, S2-173493, Agenda Item: 6.5.9 Interworking and Migration, Lenovo, May 15-19, 2017, pp. 1-5.

"Re-selection of NWDAF at change of AMF", 3GPP TSG-SA WG2 Meeting #143E, S2-2101327, Ericsson, Feb. 24-Mar. 9, 2021, 31 pages.

"Correction for dual registration support", 3GPP TSG CT WG1 Meeting #107, C1-175141, Agenda item: 15.2.1.6, LG Electronics, Nov. 27-Dec. 1, 2017, 4 pages.

International Search Report and Written Opinion received for corresponding Patent Cooperation Treaty Application No. PCT/IB2022/052899, dated Aug. 25, 2022, 23 pages.

"Dual Registration between two networks", 3GPP SA WG2 Meeting #145E, S2-2104126, Agenda Item: 9.1.4, Nokia, May 17-28, 2021, pp. 1-2.

* cited by examiner

300

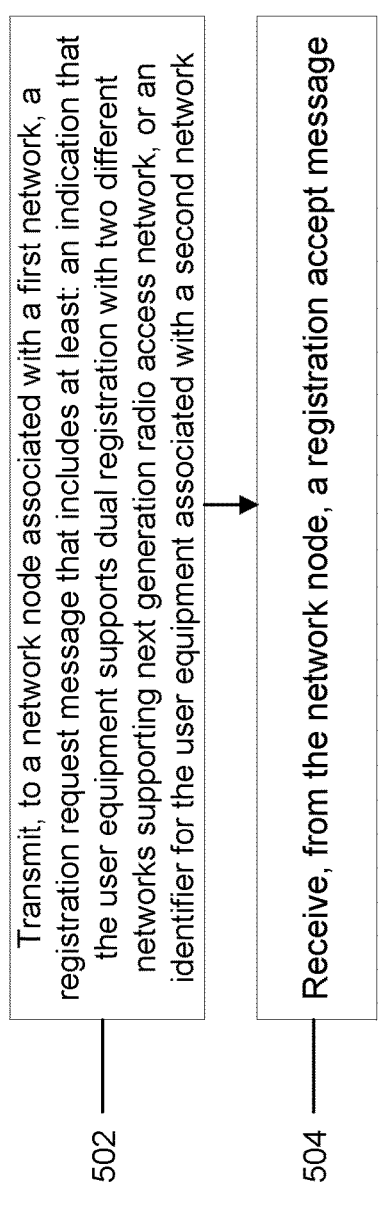

502 — Transmit, to a network node associated with a first network, a registration request message that includes at least: an indication that the user equipment supports dual registration with two different networks supporting next generation radio access network, or an identifier for the user equipment associated with a second network 504 — Receive, from the network node, a registration accept message

Receive a registration request message that includes an indication that a user equipment supports dual registration with two different networks supporting next generation radio access network, or an identifier for the user equipment associated with a second network

602

Transmit a registration accept message

604

600

700

702    Receive a first paging message from a first network node associated with a first network 704    Based on failing to respond to the first paging message, receive a second paging message from a second network node associated with a second network

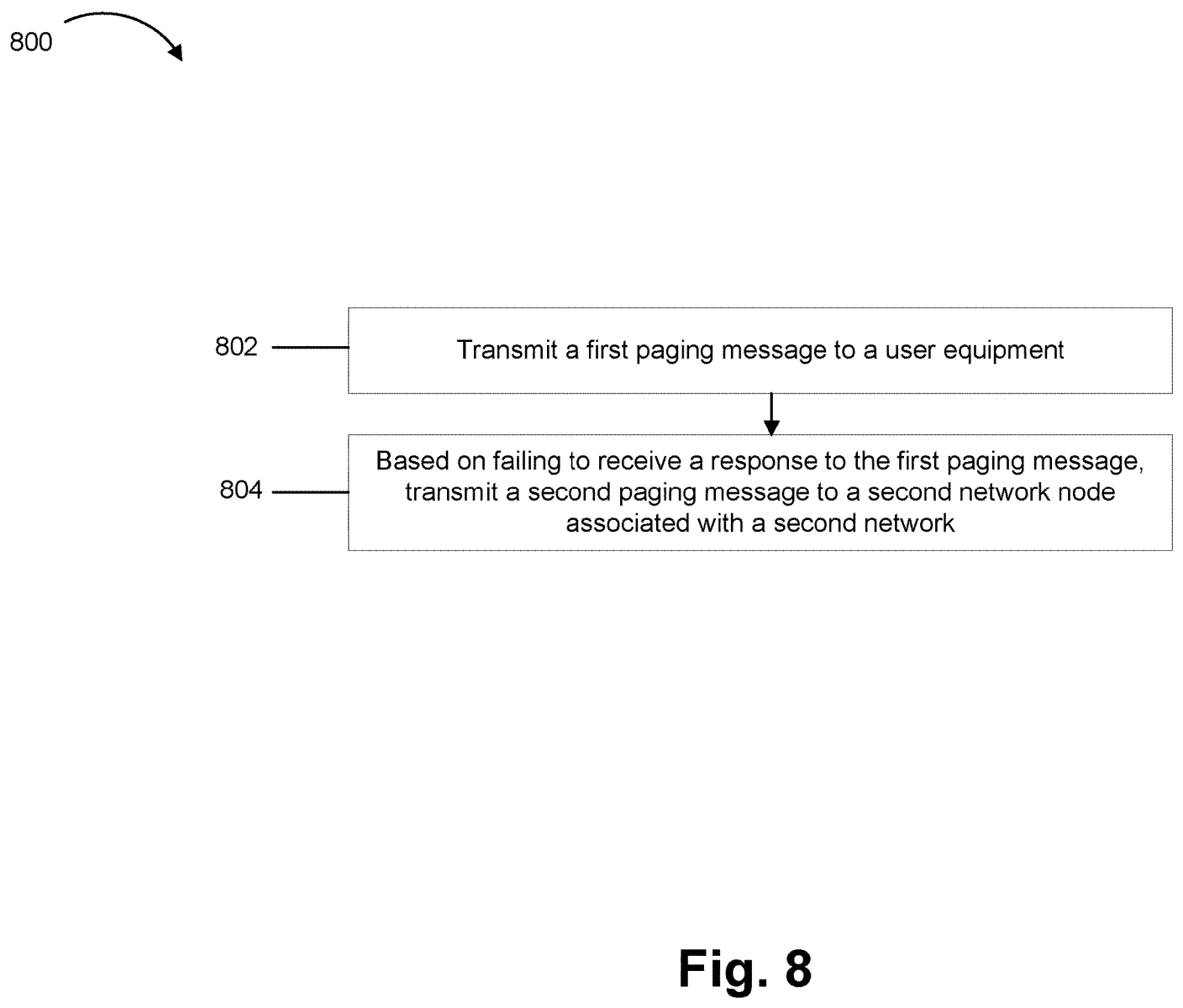

800

802 — Transmit a first paging message to a user equipment

804 — Based on failing to receive a response to the first paging message, transmit a second paging message to a second network node associated with a second network

Fig. 8

SIMULTANEOUS REGISTRATION TO MULTIPLE NETWORKS

RELATED APPLICATION

This application is a national stage application of PCT Application No. PCT/IB2022/052899, filed on Mar. 29, 2022, which claims the benefit of priority of U.S. Provisional Patent Application No. 63/169,563, filed Apr. 1, 2021, both of which are incorporated herein by reference.

FIELD

Some example aspects of the present disclosure generally relates to mobile or wireless telecommunication systems, such as mobile or wireless telecommunication systems based on Long Term Evolution (LTE) or fifth generation (5G) or new radio (NR) radio access technology, or other telecommunications systems. For example, certain aspects of the present disclosure relate to systems and/or methods for simultaneous registration to multiple networks.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire™, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also built on E-UTRA. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA.

SUMMARY

According to a first example aspect of the present disclosure, an apparatus includes at least one processor and at least one memory including computer program code. The at least one memory and the computer program code are configured to, with the at least one processor, cause the apparatus to transmit, to a network node associated with a first network, a registration request message. The registration request message may include at least an indication that the apparatus supports dual registration with two different networks supporting next generation radio access network, or an identifier for the apparatus associated with a second network. The at least one memory and the computer program code may be configured to, with the at least one processor, cause the apparatus to receive, from the network node, a registration accept message.

In a variant, the registration accept message may further include at least an indication that the dual registration to the first network is accepted. In a variant, the registration request message may further include at least an indication of allowed network slices per network or a recommended network for rejected network slices. In a variant, the registration request message may further include an identifier for the apparatus associated with the first network. In a variant, the at least one memory and the computer program code may be configured to, with the at least one processor, further cause the apparatus to determine the dual registration to the first network and the second network. In a variant, the at least one memory and the computer program code may be configured to, with the at least one processor, further cause the apparatus, when determining the dual registration, to determine the dual registration to the first network and the second network based on one or more allowed network slices or one or more rejected network slices. In a variant, the network node may include an access and mobility management function.

According to a second example aspect of the present disclosure, an apparatus includes at least one processor and at least one memory including computer program code. The at least one memory and the computer program code may be configured to, with the at least one processor, cause the apparatus to receive a registration request message. The registration request message may include at least: an indication that a user equipment supports dual registration with two different networks supporting next generation radio access network, or an identifier for the user equipment associated with a second network. The apparatus may be associated with a first network. The at least one memory and the computer program code may be configured to, with the at least one processor, cause the apparatus to transmit a registration accept message.

In a variant, the registration accept message may include at least an indication that the dual registration to the first network is accepted. In a variant, the registration request message may include at least an indication of allowed network slices per network or a recommended network for rejected network slices. In a variant, the registration request message may further include an identifier for the user equipment associated with the first network. In a variant, the at least one memory and the computer program code may be configured to, with the at least one processor, cause the apparatus to transmit a registration-related message to a network node. In a variant, the network node may include a unified data management function that registers multiple access and mobility management functions for the user equipment. In a variant, the apparatus may include one of the access and mobility management functions. In a variant, the at least one memory and the computer program code may be configured to, with the at least one processor, cause the apparatus to reuse a security context associated with a network node associated with the first network.

According to a third example aspect of the present disclosure, an apparatus includes at least one processor and at least one memory including computer program code. The at least one memory and the computer program code may be configured to, with the at least one processor, cause the apparatus to transmit a first paging message to a user equipment. The apparatus may be associated with a first network. The at least one memory and the computer program code may be configured to, with the at least one processor, cause the apparatus to, based on failing to receive a response to the first paging message, transmit a second paging message to a network node associated with a second network. The second paging message may be associated with causing the network node to transmit a paging message to the user equipment. The second paging message may be indicated to the second network via a core network interface. The second paging message can be transmitted simultaneously to a second paging attempt on the first network. The user equipment may have dual registration to both the first network and the second network. The cells associated with the first network and the second network may be mapped to different frequencies.

In a variant, the apparatus may include an access and mobility management function. In a variant, the network node may include an access and mobility management function. In a variant, the at least one memory and the computer program code may be configured to, with the at least one processor, further cause the apparatus, when transmitting the first paging message, to transmit the first paging message via a base station. In a variant, the at least one memory and the computer program code may be configured to, with the at least one processor, further cause the apparatus to transmit a third paging message in connection with the second paging message. In a variant, the core network interface may include an N14 interface.

According to a fourth example aspect of the present disclosure, an apparatus that includes at least one processor and at least one memory including computer program code. The at least one memory and the computer program code may be configured to, with the at least one processor, cause the apparatus to receive, from a first network, a list of identifiers identifying networks associated with a single network slice selection assistance information. The at least one memory and the computer program code may be configured to, with the at least one processor, cause the apparatus to select a second network using the list of identifiers. A network slice identified by the single network slice selection assistance information may be used.

According to a fifth example aspect of the present disclosure, a method includes transmitting, by a user equipment to a network node associated with a first network, a registration request message. The registration request message may include at least: an indication that the user equipment supports dual registration with two different networks supporting next generation radio access network, or an identifier for the user equipment associated with a second network. The method may include receiving, from the network node, a registration accept message.

In a variant, the registration accept message may further include at least an indication that the dual registration to the first network is accepted. In a variant, the registration request message may further include at least an indication of allowed network slices per network or a recommended network for rejected network slices. In a variant, the registration request message may further include an identifier for the user equipment associated with the first network. In a variant, the method may further include determining the dual registration to the first network and the second network. In a variant, determining the dual registration may further include determining the dual registration to the first network and the second network based on one or more allowed network slices or one or more rejected network slices. In a variant, the network node may include an access and mobility management function.

According to a sixth example aspect of the present disclosure, a method includes receiving, by a network node, a registration request message. The network node may be associated with a first network. The registration request message may include at least: an indication that a user equipment supports dual registration with two different networks supporting next generation radio access network, or an identifier for the user equipment associated with a second network. The method may include transmitting a registration accept message.

In a variant, the registration accept message may include at least an indication that the dual registration to the first network is accepted. In a variant, the registration request message may include at least an indication of allowed network slices per network or a recommended network for rejected network slices. In a variant, the registration request message may further include an identifier for the user equipment associated with the first network. In a variant, the method may further include transmitting a registration-related message to another network node. In a variant, the other network node may include a unified data management function that registers multiple access and mobility management functions for the user equipment. In a variant, the network node may include one of the access and mobility management functions. In a variant, the method may include reusing a security context associated with another network node associated with the first network.

According to a seventh example aspect of the present disclosure, a method that includes transmitting, by a first network node, a first paging message to a user equipment. The first network node may be associated with a first network. The method may include, based on failing to receive a response to the first paging message, transmitting a second paging message to a second network node associated with a second network. The second paging message may be associated with causing the second network node to transmit a paging message to the user equipment. The second paging message may be indicated to the second network via a core network interface. The second paging message can be transmitted simultaneously to a second paging attempt on the first network. The user equipment may have dual registration to both the first network and the second network. Cells associated with the first network and the second network may be mapped to different frequencies.

In a variant, the first network node may include an access and mobility management function. In a variant, the second network node may include an access and mobility management function. In a variant, transmitting the first paging message may further include transmitting the first paging message via a base station. In a variant, the method may further include transmitting a third paging message in connection with the second paging message. In a variant, the core network interface may include an N14 interface.

According to an eighth example aspect of the present disclosure, a method includes receiving, from a first network, a list of identifiers identifying networks associated with a single network slice selection assistance information. The method may include selecting a second network using the list of identifiers. A network slice identified by the single network slice selection assistance information may be used.

A ninth example aspect of the present disclosure may be directed to an apparatus includes circuitry configured to cause the apparatus to perform the method according to the fifth aspect, the sixth aspect, the seventh aspect, or the eighth aspect of the present disclosure, or any of the variants of those aspects of the present disclosure discussed above.

A tenth example aspect of the present disclosure may be directed to an apparatus includes means for performing the method according to the fifth example aspect, the sixth example aspect, the seventh example aspect, or the eighth example aspect of the present disclosure, or any of the variants of those example aspects of the present disclosure discussed above. Examples of the means may include one or more processors, memory, and/or computer program codes for causing the performance of the operation.

An eleventh example aspect of the present disclosure may be directed to a computer readable medium program instructions stored thereon for causing an apparatus to perform at least the method according to the fifth example aspect, the sixth example aspect, the seventh example aspect, or the eighth example aspect of the present disclosure, or any of the variants of those example aspects of the present disclosure discussed above.

A twelfth aspect may be directed to a computer program product encoding instructions for causing an apparatus to perform at least the method according to the fifth example aspect, the sixth example aspect, the seventh example aspect, or the eighth example aspect of the present disclosure, or any of the variants of those example aspects of the present disclosure discussed above.

BRIEF DESCRIPTION OF THE DRAWINGS

For proper understanding of example embodiments, reference should be made to the accompanying drawings, wherein:

FIG. 5 illustrates an example flow diagram of a method, according to some embodiments;

FIG. 8 illustrates an example flow diagram of a method, according to some embodiments;

DETAILED DESCRIPTION

Figure 1:
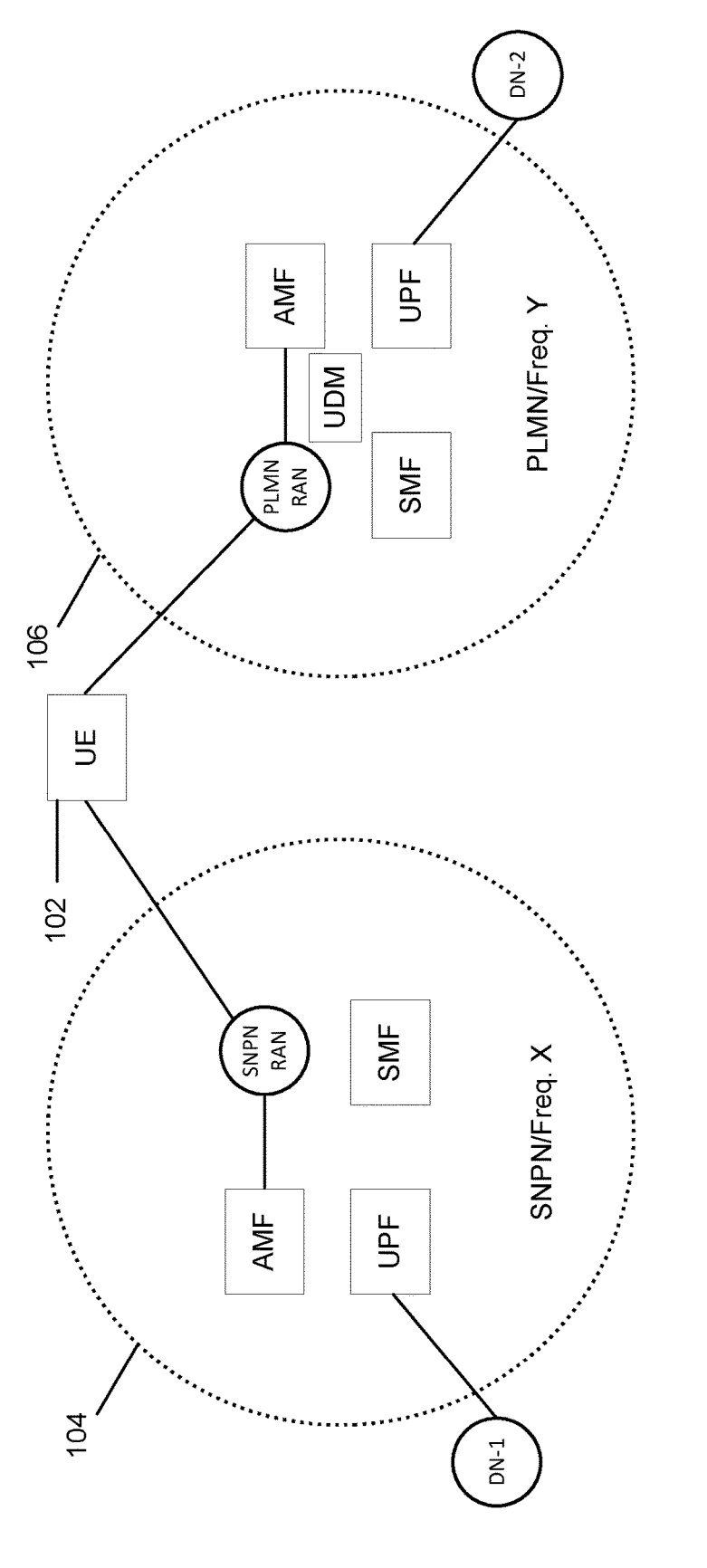
FIG. 1 illustrates an example architecture for dual registration, according to some embodiments.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for simultaneous registration to multiple networks is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

A 5G system (5GS) may support the ability for a UE to be registered at a given time within the 5G core network (5GS) and in one public land mobile network (PLMN) or standalone non-public network (SNPN) with a set of credentials. For example, a UE may have a single universal subscriber identity module (USIM). Equivalent PLMNs, or a PLMN and an SNPN, may provide different sets of services and/or network slices, and operators of those network (e.g., the equivalent PLMNs or the PLMN and the SNPN) may coordinate to offer their services to each other's subscribers. Equivalent PLMNs may include PLMNs where identities of those PLMNs are included in a tracking area identifier (TAI) list during the registration procedure. For a home PLMN, an equivalent PLMN may include a PLMN entry contained in an equivalent home PLMN (HPLMN) list (EHPLMN list). For example, to allow provision for multiple HPLMN codes, PLMN codes that are present within the HPLMN list may replace the HPLMN code derived from the international mobile subscriber identity (IMSI) for PLMN selection purposes. This list may be stored on the universal subscriber identity module (USIM) and may be known as the EHPLMN list. The EHPLMN list may also include the HPLMN code derived from the IMSI. If the HPLMN code derived from the IMSI is not present in the EHPLMN list then it may be treated as a visited PLMN for PLMN selection purposes.

Dual registration may provide benefits to a UE, such as dual receive (RX) and transmit (TX) so that the UE can receive and transmit packets simultaneously. Dual registration with two networks using a set of credentials may be possible in two cases: 1) between an evolved packet system (EPS) and a 5GS; and 2) between a 5GS and a 5GS using non-Third Generation Partnership Project (3GPP) access network interworking function (N3IWF) architecture for UEs (e.g., one registration to the 5GS over 3GPP access and the other registration to 5GS over non-3GPP access). In other words, dual registration may support access to a 5GS and an EPS or to 5GSs via different access types. However, these cases may not include a scenario where different sets of services or network slices are supported across different networks and where UEs register with two different 5GSs, as a result of limitations in lower layers (e.g., the physical layer) due to, e.g., frequency interference. With 5G deployments, however, scenarios that involve multiple PLMNs, multiple SNPNs, or a combination of PLMNs and SNPNs may support different frequency layers. As a result, the above-described issues, such as interference, may not occur. As can be understood from the above, there may be a need for UE registration to multiple networks (e.g., 5GS networks) simultaneously using a set of credentials.

Some embodiments described herein may provide for simultaneous registration to multiple networks. For example, certain embodiments may provide for simultaneous registration to multiple 5GS networks using a set of credentials, such as a USIM or a set of credentials configured in a mobile equipment (ME). In certain embodiments, a UE may use a single set of credentials to register to multiple networks. Certain embodiments may provide for a UE to perform dual registration between a 5GS of equivalent PLMNs, equivalent SNPNs, or a combination of PLMNs and SNPNs. In dual-registration mode, the UE may handle independent registrations for a core network (e.g., a 5G core (5GC)) in a first network (network-1) and a core network in a second network (network-2) using separate radio resource control (RRC) connections. In this mode, the UE may maintain a first identifier for the first network (e.g., a first globally unique temporary identifier (GUTI-1)) and second identifier for the second network (e.g., a second GUTI (GUTI-2)) independently. During registration, the UE may provide one identifier assigned by a network, if previously allocated by the core network, for registrations towards another core network in another network. In this way, the UE may be registered to a first core network and a second core network and both core networks may be aware of the UEs registration and identifier of the other network.

When a UE is registered to the first network, the UE may select the second network for a second registration based on one or more criteria. For example, the criteria may include whether the second network supports one or more network slices (e.g., based on single network slice selection assistance information (S-NSSAI)) which the UE determines to use and which are not supported by the first network. In order to find a network that satisfies the criteria, the UE can process information related to the network slices (e.g., NSSAI) configured for each available network. For example, if there is an S-NSSAI that the UE determines to use, and the S-NSSAI is not supported by the first network and is included in the configured NSSAI for a network currently available for the UE, the UE may select the network as its second network for a second registration. In this way, certain embodiments described here may enable a UE to access mutually exclusive services across different networks using a set of credentials, thereby facilitating a wider array of UE operations.

FIG. 1 illustrates an example architecture 100 for dual registration, according to some embodiments. For example, the example architecture 100 may include a UE 102, an SNPN 104 and a PLMN 106. As illustrated in FIG. 1, the SNPN 104 may include an access and mobility management function (AMF), an SNPN radio access network (RAN), a user plane function (UPF) connected to a first data network (DN) (e.g., the Internet or an Internet protocol multimedia subsystem (IMS)), and a session management function (SMF). The SNPN 104 may be associated with a first frequency (frequency X). The PLMN 106 may include a PLMN RAN, an AMF, a UPF connected to a second DN, an SMF, and a unified data management (UDM) function. The PLMN 106 may be associated with a second frequency (frequency Y) that is different than the first frequency with which the SNPN 104 is associated. The UDM may be configured to maintain a registration of a UE in the AMF of the PLMN 106 and the AMF of the SNPN 104. The UE may be configured for dual registration with two different frequencies, so that the UE can connect to both the SNPN 104 and the PLMN 106. As further illustrated in FIG. 1, the UE may be connected the SNPN RAN and the PLMN RAN and may be registered in both the SNPN 104 and PLMN 106. The UE may be registered in both the SNPN 104 and the PLMN 106 using a set of credentials. In certain embodiments, the UE may be registered using a single set of credentials. The term "single set of credentials," as used herein is not intended to limit the embodiments described herein to an exact same set of credentials that is used for registration to both the SNPN 104 and the PLMN 106. For example, a base set of credentials could be used for both registrations, with additional network-specific information for each registration appended to the base set of credentials, different versions of the same type of credentials may be used for different registrations, or the same set of credentials may be used for different registrations.

As described above, FIG. 1 is provided as an example. Other examples are possible, according to some embodiments.

Figure 2:
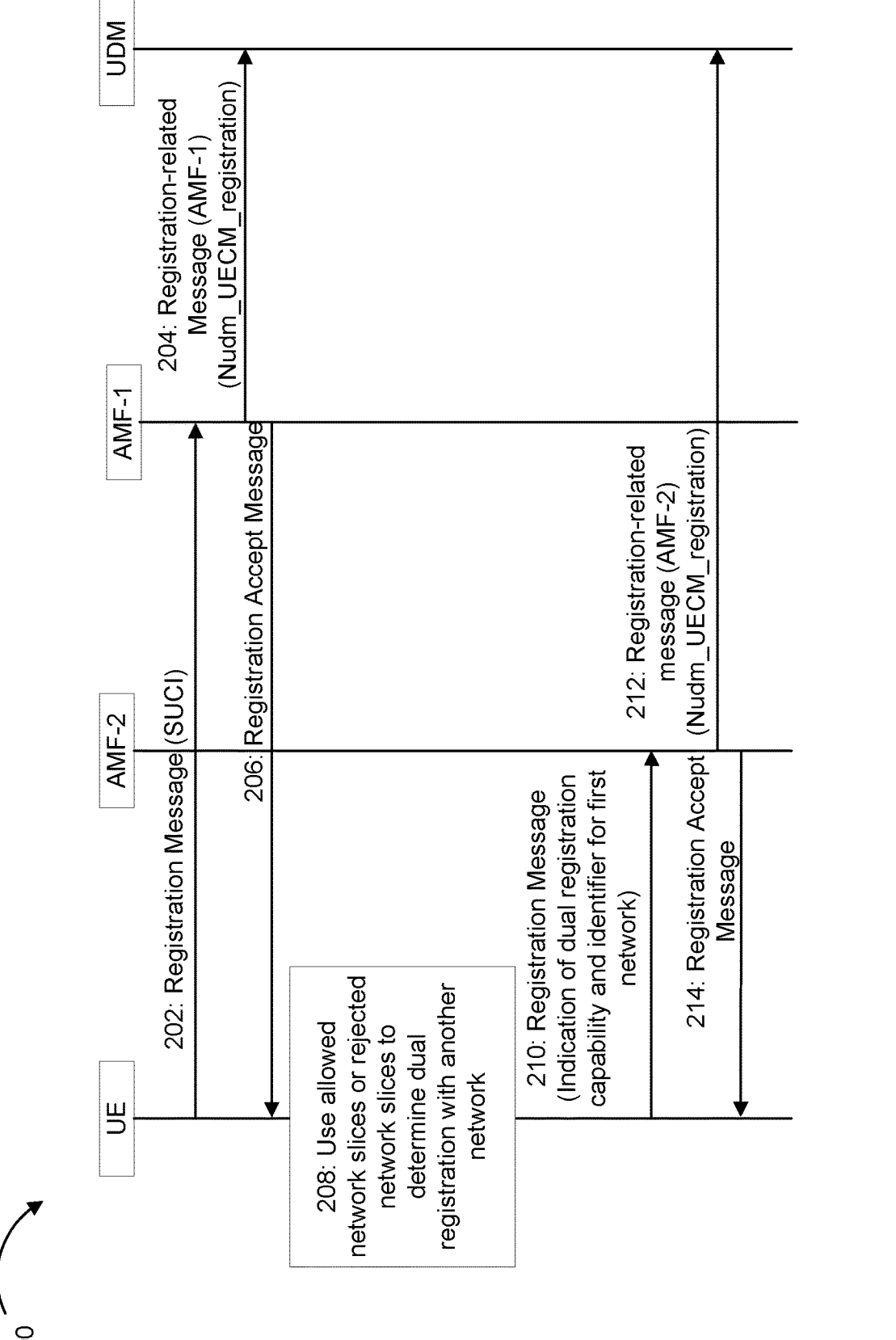
FIG. 2 illustrates an example signal diagram for dual registration between two cellular systems, according to some embodiments.

FIG. 2 illustrates an example signal diagram 200 for dual registration between two cellular systems, according to some embodiments. As illustrated in FIG. 2, the example signal diagram 200 may include a UE, a first AMF (AMF-1) associated with a first network, a second AMF (AMF-2) associated with a second network, and a UDM. The UDM may be configured to support dual registration for a UE within a cellular system (e.g., a 5GS), and may store the registrations for the UE to the first network and the second network.

As illustrated at 202, the UE may transmit, and the first AMF may receive, a registration message (e.g., a registration request). For example, the registration message may include an identifier associated with the UE, such as a subscriber concealed identifier (SUCI). In another example, the registration message may include an indication whether the UE supports dual registration (to different 5G networks). As illustrated at 204, the first AMF may transmit, and the UDM may receive, a registration-related message to register the UE at the first AMF. For example, the registration-related message may include a Nudm_UECM_registration message). As illustrated at 206, the first AMF may transmit, and the UE may receive, a registration accept message from the first network. The registration accept message may include an indication of allowed network slices (S-NSSAIs) per PLMN or SNPN in an equivalent network, or a recommended PLMN or SNPN for rejected network slices (e.g., for each of the S-NSSAIs in a rejected NSSAI). In this way, a network may provide supported or allowed S-NSSAIs on a per PLMN or SNPN basis while sending the equivalent PLMN and/or equivalent SNPN list. This may help the UE determine when it needs to perform dual registration with another network, e.g., by providing the UE with information regarding S-NSSAIs supported per PLMN or SNPN within equivalent PLMNs. As illustrated at 208, the UE may use the allowed network slices or the rejected network slices to determine dual registration with a second network.

In another embodiment, through the registration accept message, the first AMF may indicate one or more S-NSSAIs (e.g., via the rejected NSSAI information element) to the UE. Each of the indicated S-NSSAI(s) can be associated with: 1) a list of identifiers identifying networks (e.g., PLMNs and/or SNPNs), which can support the S-NSSAI, and the UE may search for a network which can support it; and/or 2) a cause value (e.g., the cause value "S-NSSAI not available in the current PLMN or SNPN" or "S-NSSAI not available in the current registration area", or a another cause value such as "S-NSSAI available in a different PLMN or SNPN"). Based on the list of identifiers received from the first AMF and/or configured information in the UE (e.g., configured NSSAI), the UE may select a second network.

As illustrated at 210, the UE may transmit, and the second AMF may receive, a registration message associated with registering the UE at the second network. For example, the registration message may include an indication of a dual registration capability of the UE to connect to multiple networks, such as a capability for dual registration with two 5GSs, two PLMNs, or an SNPN and a PLMN simultaneously. Additionally, or alternatively, the registration message may include an identifier for the UE for the first network. For example, when the UE is performing registration, the UE may include a GUTI assigned by the PLMN or SNPN and not the identifier assigned by an equivalent PLMN. In certain embodiments, the UE may include both identifiers for the first and second network (e.g., both GUTIs) assigned by the PLMN or SNPN and the equivalent PLMN or SNPN. As illustrated at 212, the second AMF may transmit, and the UDM may receive, a registration-related message to register the UE at the second AMF. For example, the registration-related message may include a Nudm_UECM_registration message). As illustrated at 214, the second AMF may transmit, and the UE may receive, a registration accept message from the second network. The registration accept message at 214 may include an indication that a dual registration of the UE has been accepted.

As indicated above, FIG. 2 is provided as an example. Other examples are possible, according to some embodiments.

Figure 3:
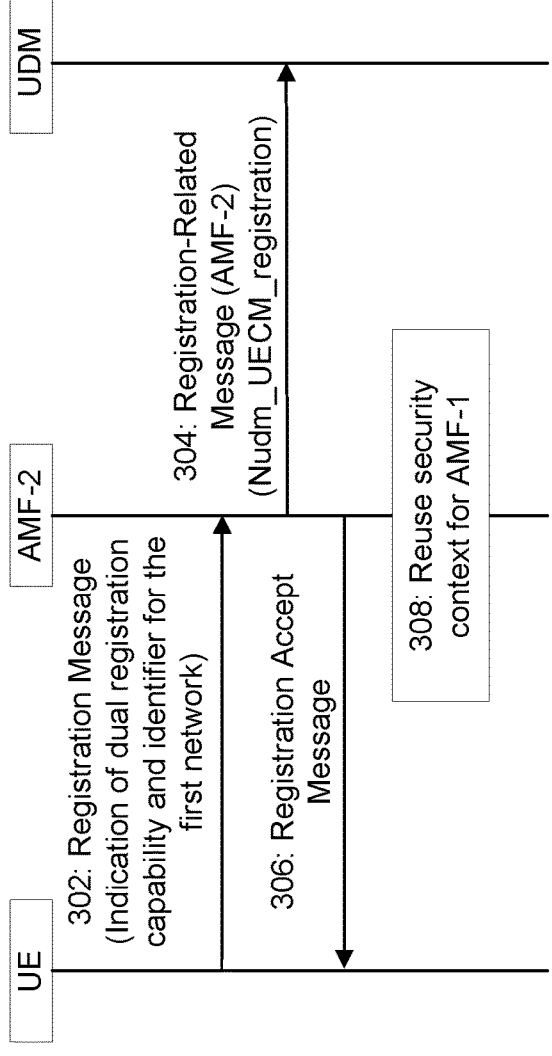
FIG. 3 illustrates an example signal diagram for mobility between two cellular systems, according to some embodiments.

FIG. 3 illustrates an example signal diagram 300 for mobility between two cellular systems, according to some embodiments. As illustrated in FIG. 3, the signal diagram 300 may include the UE, the second AMF (AMF-2) associated with the second network, and the UDM, similar to that described elsewhere herein. The first AMF (AMF-1) associated with the first network is not illustrated in FIG. 2. As illustrated at 302, the UE may transmit, and the second AMF may receive, a registration message associated with registering the UE at the second network. For example, the registration message may include an indication of a dual registration capability of the UE to connect to multiple networks. Additionally, or alternatively, the registration message may include an identifier (e.g., a GUTI) for the UE for the first network. Additionally, or alternatively, the registration message may include an identifier (e.g., a GUTI) for the UE for the second network.

As illustrated at 304, the second AMF may transmit, and the UDM may receive, a registration-related message to register the UE at the second AMF. For example, the registration-related message may include a Nudm_UECM_registration message). As illustrated at 306, the second AMF may transmit, and the UE may receive, a registration accept message from the second network. The registration accept message at 214 may include an indication that a dual registration of the UE has been accepted, an indication of allowed network slices (NSSAIs) per PLMN or SNPN in an equivalent network, or a recommended PLMN or SNPN for rejected network slices (e.g., for each of the S-NSSAIs in a rejected NSSAI). As illustrated at 308, the AMF-2 may reuse a security context for the first AMF. In some embodiments, full authentication may not have to be performed in connection with the operations illustrated at 308. For example, the second AMF (target AMF) may determine a GUAMI of the first network by deriving this from a GUTI provided by the UE. The second AMF may use this to retrieve security and mobility context from the first AMF (source AMF) and may use this to avoid a full re-authentication procedure.

As described above, FIG. 3 is provided as an example. Other examples are possible, according to some embodiments.

Figure 4:
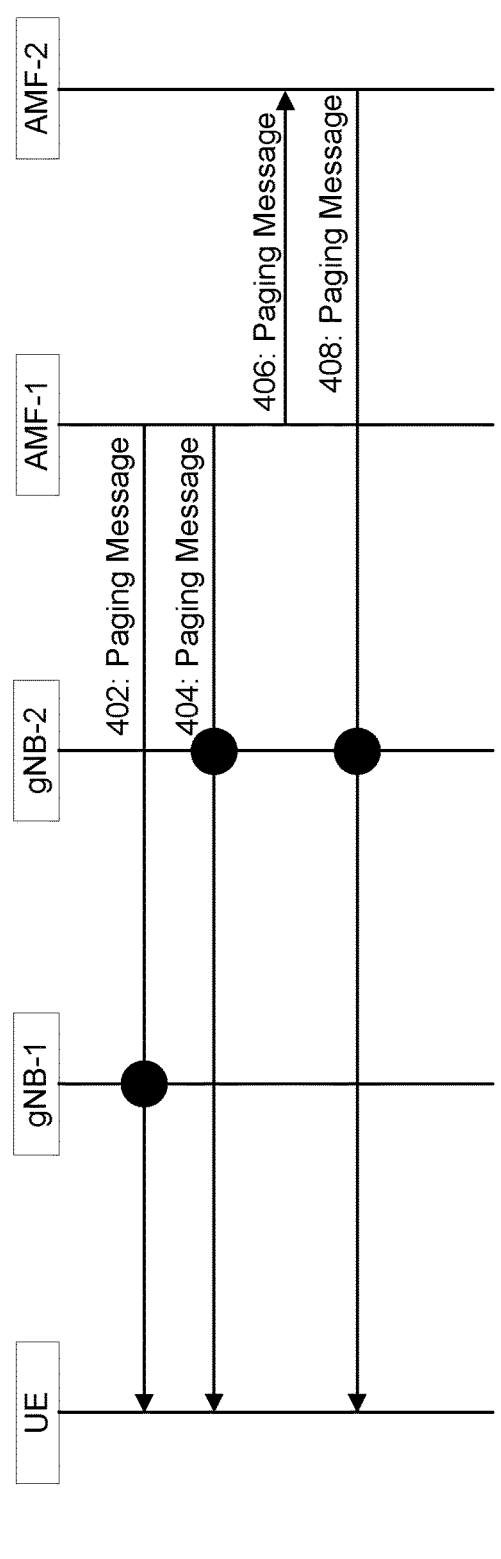
FIG. 4 illustrates an example signal diagram of a paging procedure with dual registration support, according to some embodiments.

FIG. 4 illustrates an example signal diagram 400 of a paging procedure with dual registration support, according to some embodiments. As illustrated in FIG. 4, the example signal diagram 400 may include a UE, a first gNB (gNB-1), a second gNB (gNB-2), a first AMF (AMF-1) associated with a first network, and a second AMF (AMF-2) associated with a second network.

As illustrated at 402, the first AMF may transmit, and the UE may receive, a paging message (e.g., a paging request). The first AMF may transmit the paging message at 402 via the first gNB. As illustrated at 404, the first AMF may transmit, and the UE may receive, a paging message. The first AMF may transmit the paging message at 404 via the second gNB. Based on failing to receive a response to the paging request at 402 and/or at 404, the first AMF may transmit, and the second AMF may receive, a paging message at 406. The paging message at 406 may be associated with causing the second AMF to transmit a paging message to the UE. The paging message at 406 may be indicated to the second AMF via a core network interface (e.g., an N14 interface). The paging message at 406 may be transmitted simultaneously with another paging message from the first AMF via the first gNB and/or the second gNB. As illustrated at 408, the second AMF may transmit, and the UE may receive, a paging message via the second gNB. In this way, a network may have the option to page the UE via other network(s), thereby initiating a paging trigger via, e.g., an N14 interface (between AMFs). This provides the network with additional options for paging escalation that would otherwise not be available to a network.

Certain embodiments may be configured to avoid simultaneous RRC connections with the same cell. For example, if the same gNB is shared by equivalent SNPN and PLMN, the UE may not attempt random access channel (RACH) access with the same cell if it is already camping in that cell. This may reduce or eliminate operational errors at the UE and/or network that might occur as the result of the UE attempting simultaneous RRC connections with the same cell.

In this way, a network may perform paging in the radio network in which the packets are received. If the UE does not respond, then the network may try to page in another network or both networks at the same time. As part of mobility, the UE may be able to include an indication for an existing protocol data unit (PDU) session indication in the paging messages.

As described above, FIG. 4 is provided as an example. Other examples are possible, according to some embodiments.

FIG. 5 illustrates an example flow diagram of a method 500, according to some embodiments. For example, FIG. 5 may illustrate example operations of a user equipment (e.g., apparatus 20 illustrated in, and described with respect to, FIG. 9b). Some of the operations illustrated in FIG. 5 may be similar to some operations shown in, and described with respect to, FIGS. 1-4.

In an embodiment, the method 500 may include, at 502, transmitting, to a network node associated with a first network, a registration request message that includes at least: an indication that the user equipment supports dual registration with two different networks supporting next generation radio access network (NG-RAN), or an identifier for the user equipment associated with a second network. For example, the transmitting at 502 may be performed in a manner similar to that at 210 of FIGS. 2 and/or 302 of FIG. 3. Cells for the first network and the second network may be mapped to different frequencies. The method 500 may include, at 504, receiving, from the network node, a registration accept message, e.g., in a manner similar to that at 214 of FIG. 2 and/or at 306 of FIG. 3.

The method illustrated in FIG. 5 may include one or more additional aspects described below or elsewhere herein. In some embodiments, the registration accept message may further include at least an indication that the dual registration to the first network is accepted. In some embodiments, the registration request message may further include at least an indication of allowed network slices per network or a recommended network for rejected network slices. In some embodiments, the registration request message may further include an identifier for the user equipment associated with the first network. In some embodiments, the method 500 may further include determining the dual registration to the first network and the second network, e.g., in a manner similar to that at 208 of FIG. 2. In some embodiments, the determining may include determining the dual registration to the first network and the second network based on one or more allowed network slices or one or more rejected network slices. In some embodiments, the network node may include an access and mobility management function.

As described above, FIG. 5 is provided as an example. Other examples are possible according to some embodiments.

Figure 6:
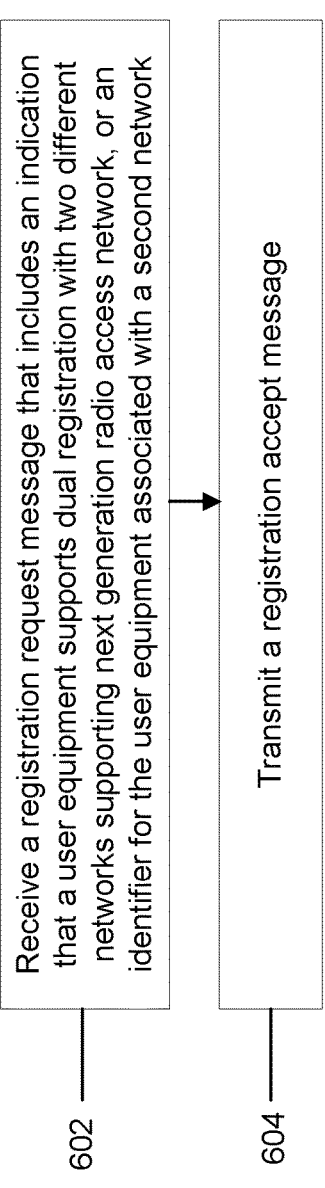
FIG. 6 illustrates an example flow diagram of a method, according to some embodiments.

FIG. 6 illustrates an example flow diagram of a method 600, according to some embodiments. For example, FIG. 6 may illustrate example operations of a network node (e.g., apparatus 10 illustrated in, and described with respect to, FIG. 9*a*). Specifically, FIG. 6 may illustrate example operations of an AMF (e.g., the AMF-2 in FIG. 2 or the AMF-2 in FIG. 3). Some of the operations illustrated in FIG. 6 may be similar to some operations shown in, and described with respect to, FIGS. 1-4.

In an embodiment, the method 600 may include, at 602, receiving a registration request message that includes an indication that a user equipment supports dual registration with two different networks supporting next generation radio access network, or an identifier for the user equipment associated with a second network. For example, the receiving at 602 may be performed in a manner similar to that at 210 of FIG. 2 and/or at 302 of FIG. 3. The network node may be associated with a first network. Cells for the first network and the second network may be mapped to different frequencies. The method 600 may include, at 604, transmitting a registration accept message, e.g., in a manner similar to that at 214 of FIG. 2 and/or at 306 of FIG. 3.

The method illustrated in FIG. 6 may include one or more additional aspects described below or elsewhere herein. In some embodiments, the registration accept message may include at least an indication that the dual registration to the first network is accepted. In some embodiments, the registration request message may include at least an indication of allowed network slices per network or a recommended network for rejected network slices. In some embodiments, the registration request message may further include an identifier for the user equipment associated with the first network. In some embodiments, the method 600 may include transmitting a registration-related message to another network node, e.g., in a manner similar to that at 212 of FIGS. 2 and/or 304 of FIG. 3. In some embodiments, the other network node may include a unified data management function that registers multiple access and mobility management functions for the user equipment, where the apparatus includes one of the access and mobility management functions. In some embodiments, the method 600 may include reusing a security context associated with a network node associated with the first network.

As described above, FIG. 6 is provided as an example. Other examples are possible according to some embodiments.

Figure 7:
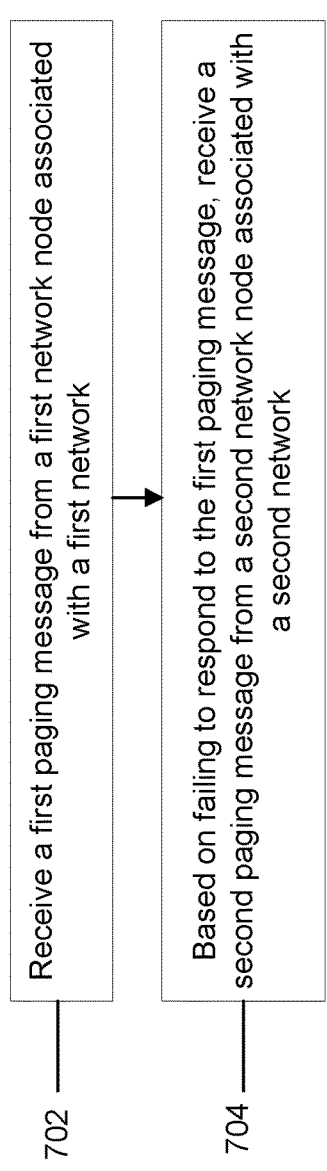
FIG. 7 illustrates an example flow diagram of a method, according to some embodiments.

FIG. 7 illustrates an example flow diagram of a method 700, according to some embodiments. For example, FIG. 7 may illustrate example operations of a user equipment (e.g., apparatus 20 illustrated in, and described with respect to, FIG. 9*b*). Some of the operations illustrated in FIG. 7 may be similar to some operations shown in, and described with respect to, FIGS. 1-4.

In an embodiment, the method 700 may include, at 702, receiving a first paging request from a first network node associated with a first network, e.g., in a manner similar to that at 404 of FIG. 4. The method 700 may include, at 704, based on failing to respond to the first paging request, receive a second paging message from a second network node associated with a second network, e.g., in a manner similar to that at 408 of FIG. 4. The user equipment may have dual registration to both the first network and the second network. Cells associated with the first network and the second network may be mapped to different frequencies.

The method illustrated in FIG. 7 may include one or more additional aspects described below or elsewhere herein. In some embodiments, the first network node may include an access and mobility management function. In some embodiments, the second network node may include an access and mobility management function. In some embodiments, the receiving at 702 may include receiving the first paging message via a base station. In some embodiments, the receiving at 704 may include receiving the second paging request via the base station.

As described above, FIG. 7 is provided as an example. Other examples are possible according to some embodiments.

FIG. 8 illustrates an example flow diagram of a method 800, according to some embodiments. For example, FIG. 8 may illustrate example operations of a network node (e.g., apparatus 10 illustrated in, and described with respect to, FIG. 9*a*). Specifically, FIG. 8 may illustrate operations of an AMF (e.g., the AMF-1 of FIG. 4). Some of the operations illustrated in FIG. 8 may be similar to some operations shown in, and described with respect to, FIGS. 1-4.

In an embodiment, the method 800 may include, at 802, transmitting a first paging message to a user equipment, e.g., in a manner similar to that at 404 of FIG. 4. The network node may be associated with a first network. The method 800 may include, at 804, based on failing to receive a response to the first paging message, transmitting a second paging message to a second network node associated with a second network, e.g., in a manner similar to that at 406 of FIG. 4. In some embodiments, the second paging message may be associated with causing the second network node to transmit a paging message to the user equipment. In some embodiments, the second paging message may be indicated to the second network via a core network interface. In some embodiments, the second paging request may be transmitted simultaneously to a second paging attempt on the first network from the network node. In some embodiments, the user equipment may have dual registration to both the first network and the second network. In some embodiments, cells associated with the first network and the second network may be mapped to different frequencies.

The method illustrated in FIG. 8 may include one or more additional aspects described below or elsewhere herein. In some embodiments, the first network node may include an access and mobility management function. In some embodiments, the second network node may include an access and mobility management function. In some embodiments, the transmitting at 802 may include transmitting the first paging message via a base station. In some embodiments, the method 800 may further include transmitting a third paging message in connection with the second paging message. In some embodiments, the core network interface may include an N14 interface.

As described above, FIG. 8 is provided as an example. Other examples are possible according to some embodiments.

In this way, certain embodiments described herein may apply to UE(s) supporting dual registration over a 5GS with two equivalent networks (e.g., PLMN and PLMN, SNPN and SNPN, and PLMN and SNPN). As explained herein, when the UE performs initial registration, the UE may indicate that it supports dual registration capability towards the network. Based on that indication, the network may provide the S-NSSAI(s) supported by the equivalent networks (PLMN or SNPN) along with the allowed S-NSSAI(s) for the serving network. Based on that provisioning, the UE can determine to operate in dual registration mode and can register with the 5GS in the equivalent network.

According to certain embodiments, for a UE operating in dual registration mode between a 5GS and a 5GS, the UE may selectively establish PDU sessions in each network depending on the features supported by each network (e.g., as indicated in the registration accept message by the serving network along with the capabilities of equivalent networks). The UE operating in dual registration mode may register in the two networks before establishing PDU sessions. The UE may perform a PDU session establishment from a 5GC of one network to a 5GC of another network using the UE-initiated PDU session establishment procedure with a PDU session indication (e.g., an "Existing PDU Session" indication). The UE may selectively transfer certain PDU sessions to the 5GC of one network, while keeping some PDU sessions in the 5GC of another network. The UE may maintain the registration up to date in both 5GCs by re-registering periodically in both networks. If the registration in either 5GC times out (e.g., upon mobile reachable timer expiry), the corresponding network may start an implicit detach timer. A UE operating in dual-registration mode between 5GS may provide a 5G-GUTI allocated by the serving network. Alternatively, the UE may provide a 5G-GUTI allocated by both the serving network and the equivalent network. When the network tries to page the UE for DL transaction (either cyclic prefix (CP) signalling or user plane (UP) traffic), the UE may page via the network in which it is camping. If the UE does not respond, the network may try to page in the other network or both networks at the same time.

Figures 9A, 9B:
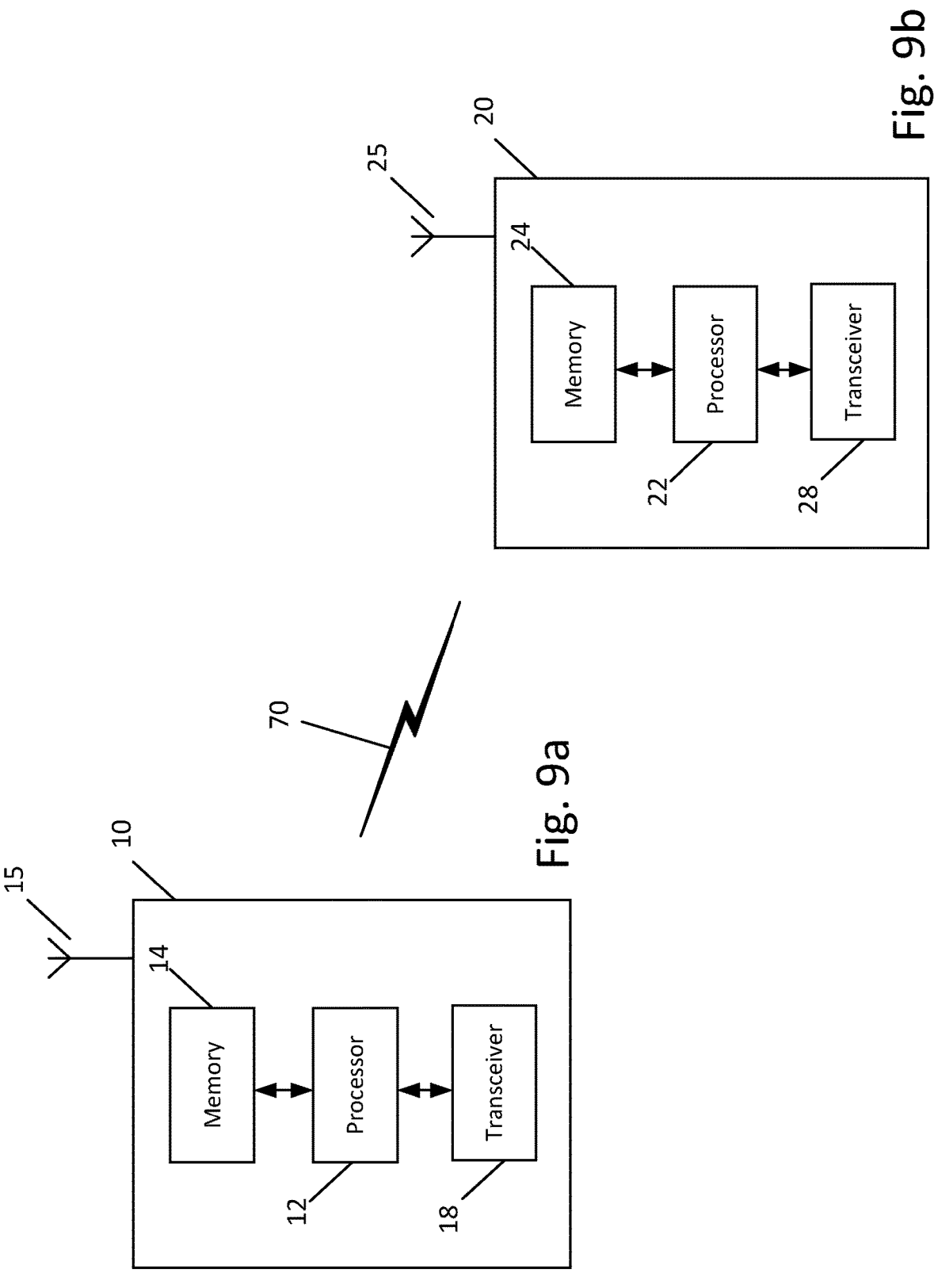
FIG. 9a illustrates an example block diagram of an apparatus, according to an embodiment.
FIG. 9b illustrates an example block diagram of an apparatus, according to another embodiment.

FIG. 9a illustrates an example of an apparatus 10 according to an embodiment. In an embodiment, apparatus 10 may be a node, host, or server in a communications network or serving such a network. For example, apparatus 10 may be a network node, access and mobility management function (AMF), unified data management (UDM) function, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9a.

As illustrated in the example of FIG. 9a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-4, 6, and 8. For instance, apparatus 10 may be controlled by memory 14 and processor 12 to perform the methods of FIGS. 6 and 8.

FIG. 9*b* illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 9*b*.

As illustrated in the example of FIG. 9*b*, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9*b*, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-5 and 7. For instance, in one embodiment, apparatus 20 may be controlled by memory 24 and processor 22 to perform the methods of FIGS. 5 and 7.

In some embodiments, an apparatus (e.g., apparatus 10 and/or apparatus 20) may include means for performing a method or any of the variants discussed herein, e.g., a method described with reference to FIGS. 5-8. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is enabling a UE to utilize services offered by various network operators. Other benefits of some example embodiments include optimal utilization of services offered by different networks and registration of a UE with different networks supporting different frequency layers. Accordingly, the use of some example embodiments results in improved functioning of communications networks and their nodes and, therefore constitute an improvement at least to the technological field of dual registration, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

5GC 5G Core
5GS 5G System
EPS Evolved Packet System
PLMN Public Land Mobile Network
SNPN Stand-Alone Non-Public Network
UE User Equipment

The invention claimed is:

1. A user equipment, comprising:
at least one processor; and
at least one memory including computer program code which,
when executed by the at least one processor, causes the user equipment to perform operations, the operations comprising:
transmitting, to a first network node associated with a first network, a registration request message to register the user equipment with the first network, wherein the registration request message comprises at least:

an indication that the user equipment supports dual registration with two different networks; and
an identifier associated with the user equipment;
receiving, from the first network node, a registration accept message indicating the user equipment is registered with the first network, the registration accept message comprising at least:
one or more single network slice selection assistance information (S-NSSAI), wherein each respective S-NSSAI of the one or more S-NSSAIs is not supported by the first network; and
lists of identifiers of networks that support the one or more network slices that are not supported by the first network, wherein a respective list of the lists of identifiers of networks is associated with a respective S-NSSAI of the one or more S-NSSAIs that are not supported by the first network;
determining, based on configured network slice selection information in the user equipment, to use a S-NSSAI of the one or more S-NSSAIs that are not supported in the first network;
selecting a second network to register with, wherein the second network that is selected is identified by an identifier from among the list of identifiers of networks that is associated with the S-NSSAI that is selected;
transmitting, to a second network node associated with the second network that is selected, a second registration request message to register the user equipment with the second network, the second registration request message comprising the indication that the user equipment supports dual registration with two different networks; and
receiving, from the second network node, a second registration accept message indicating the user equipment is registered with the second network.

2. The user equipment according to claim 1, wherein the registration request message further comprises one or more cause values associated with the one or more S-NSSAI, wherein a respective cause value of the one or more cause values is associated with a respective S-NSSAI indicates the respective S-NSSAI is not available in the first network or is not available in a current registration area of the first network.

3. The user equipment according to claim 1, wherein the registration request message further comprises an identifier for the user equipment associated with the first network.

4. The user equipment according to claim 1, wherein operations comprise, prior to the selecting:
determining to perform dual registration to the second network.

5. The user equipment according to claim 4, wherein the second registration request message further comprises an identifier of the user equipment for the first network.

6. The user equipment according to claim 1, wherein the first network node comprises an access and mobility management function.

7. An apparatus, comprising:
at least one processor; and
at least one memory including computer program code of a first network node associated with a first network,
wherein the computer program code when executed by the at least one processor, causes the apparatus to perform operations, the operations comprising:
receiving, from a user equipment, a registration request message,
wherein the registration request message comprises at least:

an indication that a user equipment supports dual registration with two different networks; and an identifier associated with the user equipment; and transmitting a registration accept message, the registration accept message indicating the user equipment is registered with the first network, the registration accept message comprising:

one or more single network slice selection assistance information (S-NSSAI), wherein each respective S-NSSAI of the one or more S-NSSAIs is not supported by the first network; and lists of identifiers of networks that support the one or more network slices that are not supported by the first network, wherein a respective list of the lists of identifiers of networks is associated with a respective S-NSSAI of the one or more S-NSSAIs that are not supported by the first network.

8. The apparatus according to claim 7, wherein the registration request message further comprises one or more cause values associated with the one or more S-NSSAIs, wherein a respective cause value of the one or more cause values is associated with a respective S-NSSAI indicates the respective S-NSSAI is not available in the first network or is not available in a current registration area of the first network.

9. The apparatus according to claim 7, wherein the registration request message further comprises an identifier for the user equipment associated with the first network.

10. The apparatus according to claim 7, wherein the operations further comprise:

transmitting, to a unified data management function, a registration-related message to register a registration of the user equipment with the first network.

11. A method, comprising:

transmitting, by a user equipment to a first network node associated with a first network, a registration request message to register the user equipment with the first network, wherein the registration request message comprises at least:

an indication that the user equipment supports dual registration with two different networks; and an identifier for the user equipment associated with the user equipment;

receiving, by the user equipment from the first network node, a registration accept message indicating the user equipment is registered with the first network, the registration accept message comprising at least:

one or more single network slice selection assistance information (S-NSSAI), wherein each respective S-NSSAI of the one or more S-NSSAIs is not supported by the first network; and lists of identifiers of networks that support the one or more network slices that are not supported by the first network, wherein a respective list of the lists of identifiers of networks is associated with a respective S-NSSAI of the one or more S-NSSAIs that are not supported by the first network;

determining, based on configured network slice selection information in the user equipment, to use a S-NSSAI of the one or more S-NSSAIs that are not supported in the first network;

selecting a second network to register with, wherein the second network that is selected is identified by an identifier from among the list of identifiers of networks that is associated with the S-NSSAI that is selected;

transmitting, to a second network node associated with the second network that is selected, a second registration request message to register the user equipment with the second network, the second registration request message comprising the indication that the user equipment supports dual registration with two different networks; and receiving, from the second network node, a second registration accept message indicating the user equipment is registered with the second network.

12. The method according to claim 11, wherein the registration request message further comprises a cause value associated with each respective S-NSSAI of the one or more S-NSSAIs, wherein the cause value associated with a respective S-NSSAI indicates the respective S-NSSAI is not available in the first network or is not available in a current registration area of the first network.

13. The method according to claim 11, wherein each respective S-NSSAI is further associated with a cause value, and wherein the cause value associated with a respective S-NSSAI indicates the respective S-NSSAI is not available in the first network or is not available in a current registration area of the first netwo.

14. The method according to claim 11, further comprising:

prior to the selecting, determining to perform dual registration to the second network.

15. The method according to claim 14, wherein the second registration request comprises an identifier of the user equipment for the first network.

* * * * *